United States Patent [19]

Fernald

[11] 3,761,877

[45] Sept. 25, 1973

[54] OPTICAL GRAPHIC DATA TABLET

[76] Inventor: Olaf H. Fernald, 44 Hundreds Cir., Wellesley, Mass. 02181

[22] Filed: Dec. 21, 1970

[21] Appl. No.: 100,217

[52] U.S. Cl. ............ 340/146.3 SY, 35/9 H, 178/18, 178/19, 250/220 R

[51] Int. Cl. ............ G08b 5/00

[58] Field of Search ............ 178/18, 19; 340/324 A, 172.5, 146.3 SY, 146.3 AH, 146.3 H; 33/1 M; 250/237 G, 220 M, 203 R, 219 CR, 219 DR; 35/9 A, 9 B, 9 C, 9 E; 235/61.11 E

[56] References Cited

UNITED STATES PATENTS

| | | | |
|---|---|---|---|
| 3,539,995 | 11/1970 | Brandt | 178/19 X |
| 3,584,142 | 6/1971 | Schoeffler | 340/172.5 X |
| 3,408,458 | 10/1968 | Hennis | 340/146.3 AH |
| 2,922,333 | 1/1960 | Subach et al. | 33/1 M |
| 3,538,622 | 11/1970 | Zadig | 35/9 A |
| 3,449,585 | 6/1969 | Trehub | 340/146.3 AG |
| 3,502,851 | 3/1970 | Kakimoto et al. | 340/146.3 K |

OTHER PUBLICATIONS

Kagan, "Electrographic Transmitter," Western Electric Tech. Digest No. 6, April, 1967, pp. 27 & 28.

Montedonico, IBM Tech. Disclosure Bulletin, "Self-Adjusting Swivel Tip for Light Pen," Vol. 11, No. 12, May, 1969, pp. 1761 & 1762.

*Primary Examiner*—Maynard R. Wilbur
*Assistant Examiner*—Leo H. Boudreau
*Attorney*—Morse, Altman & Oates

[57] ABSTRACT

An optical graphic data tablet operated with a light pen is provided for use as a computer input terminal. A light position sensing device detects the position of a light pen moved by the operator over a transparent plate and generates analog electrical output signals corresponding to the position of the light spot on the plate. The analog signals are converted to corresponding digital signals for use with a computer display terminal or the like. A digital position indicator is provided on the tablet cabinet for direct digital display of the stylus position so that the operator can verify the exact position before transmitting data to the computer.

16 Claims, 7 Drawing Figures

INVENTOR.
OLAF H. FERNALD
BY
Morse, Altman & Oates
ATTORNEYS

Patented Sept. 25, 1973 3,761,877

5 Sheets-Sheet 2

INVENTOR.
OLAF H. FERNALD
BY
Morse, Altman & Oates
ATTORNEYS

INVENTOR.
OLAF H. FERNALD
BY
Morse, Altman & Oates
ATTORNEYS

Patented Sept. 25, 1973 3,761,877

5 Sheets-Sheet 4

INVENTOR.
OLAF H. FERNALD
BY
Morse, Altman & Oates
ATTORNEYS

OPTICAL GRAPHIC DATA TABLET

BACKGROUND OF THE INVENTION

1. Field of the Invention

This invention relates generally to computer terminals and more particularly is directed towards a new and improved data tablet for feeding graphic plots directly to computers, displays and other peripheral equipment.

2. Description of the Prior Art

Graphic data tablets are computer input devices wherein a stylus is moved by an operator over a flat writing surface, the position of the stylus being detected by various means and associated circuitry employed to convert the stylus position into digital or analog signals that are functions of the position of the stylus on the tablet. Several graphic data tablets are currently available but have not enjoyed wide acceptance primarily by reason of the high cost of the units as well as the complexity of their operation and design. Present tablets are relatively bulky in construction and employ operating principles which do not combine precision, high speed and reliable operation.

Accordingly, it is an object of the present invention to provide a new and improved graphic data tablet of low cost construction and design. Another object of the invention is to provide a computer tablet of maximum operating convenience, a high degree of resolution, one that is flexible in mode of operation and capable of high speed use and yet extremely reliable.

SUMMARY OF THE INVENTION

This invention features a computer graphic data input terminal comprising a light position sensing device, a transparent plate mounted in optical relation to the sensing device, a light-emitting stylus movable by the operator over the plate surface and optical means for imaging the light spot from the stylus on the surface against the sensing device. The sensing device provides an analog output corresponding to the position of the stylus on the surface and an A/D converter provides a digital output for feeding data to computers and/or other digital and/or analog operated equipment. A digital display is provided at the tablet to present an instant indication as to the exact coordinate position of the stylus on the surface.

Various modes of operation are selectively available in accordance with a particular function to be performed.

DETAILED DESCRIPTION OF THE PREFERRED EMBODIMENTS

Figure 1:
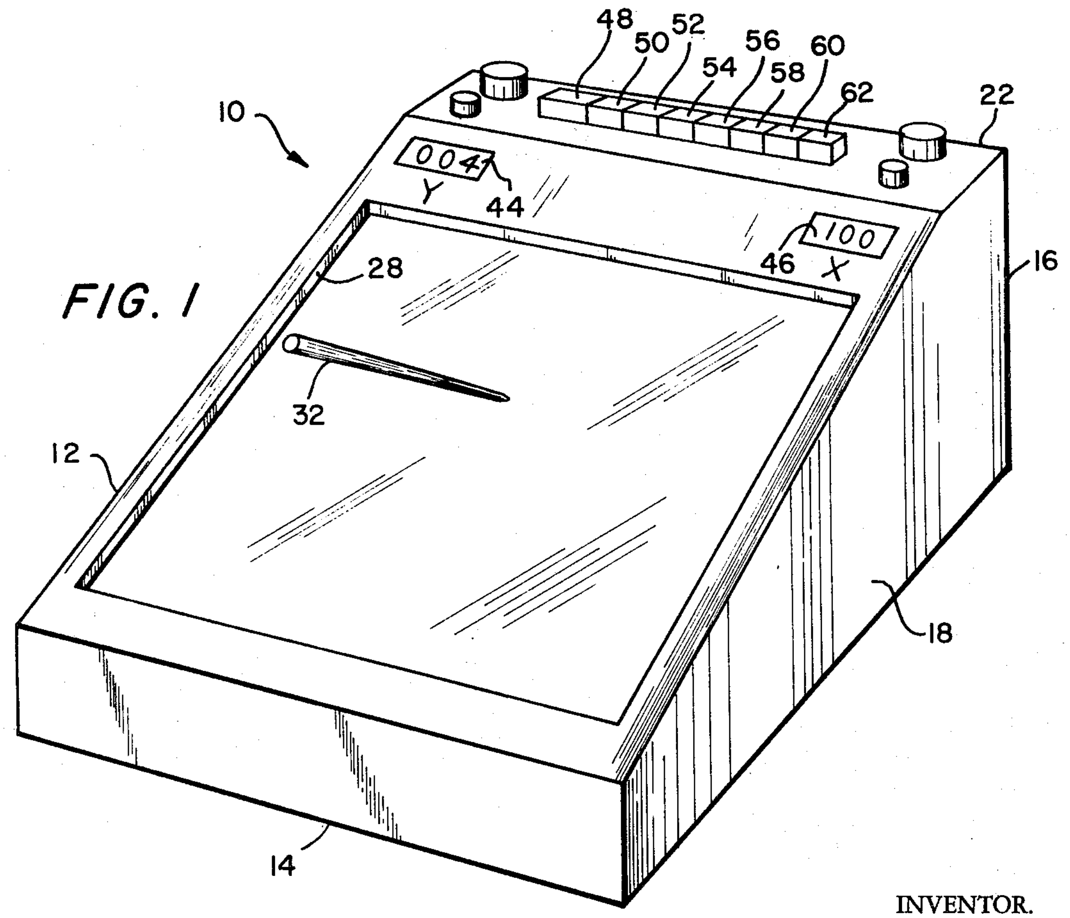
FIG. 1 is a view in perspective of a graphic data tablet made according to the invention.
Figure 2:
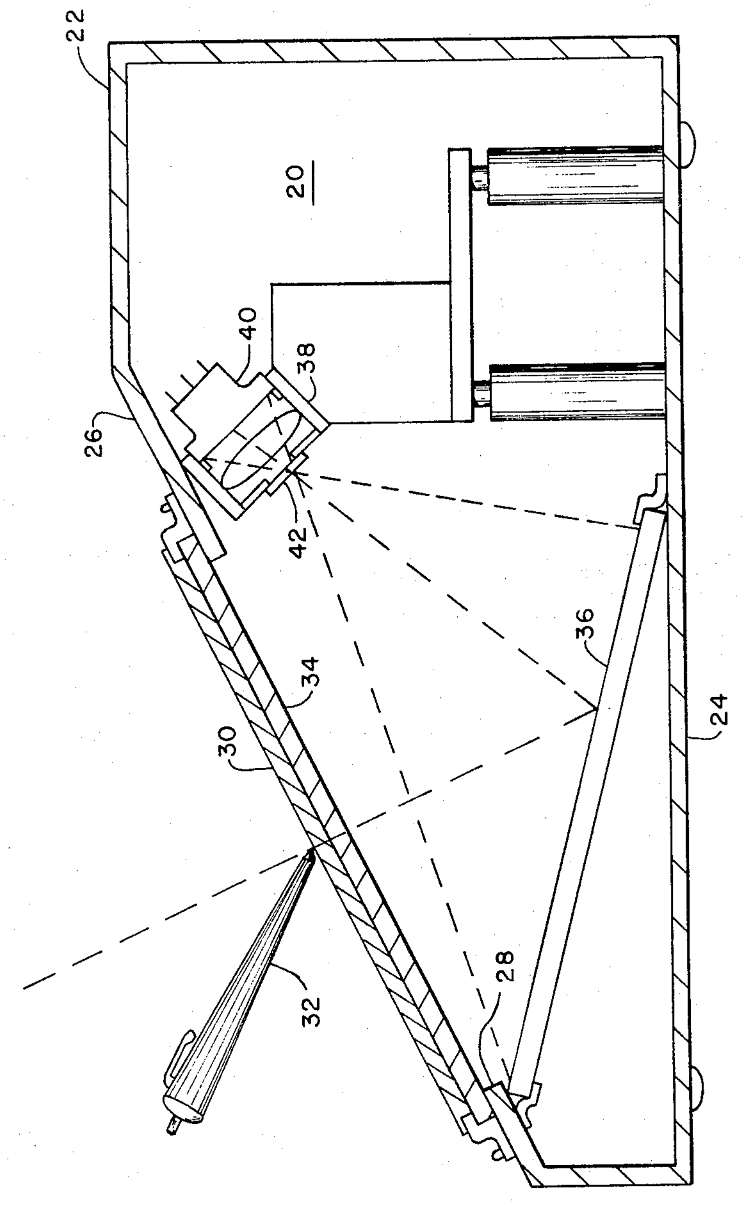
FIG. 2 is a sectional view in side elevation thereof.

Referring now to the drawings and to FIGS. 1 and 2 in particular, the reference character 10 generally indicates an optical graphic input tablet terminal organized about a housing 12 having front and rear walls 14 and 16, side walls 18 and 20, top and bottom walls 22 and 24 and an inclined wall 26. The inclined wall 26 is formed with a rectangular opening 28 across which is mounted a flat transparent plate 30, typically glass, and serving as a writing surface for a light emitting pen or stylus 32 used by an operator in conjunction with the tablet. The configuration of the housing, being relatively small and compact along with the inclined writing surface, presents a natural position for an operator to use the instrument in much the same manner as a drafting table or the like.

The plate 30 preferably is semi-reflective displaying perhaps 25 percent transmission characteristics in order to eliminate ambient background light. Mounted to the inner side of the plate 30 and substantially coextensive therewith is a fresnel lens 34 which focuses the light spot from the pen 32 against an inclined front surface mirror 36 mounted within the housing and opposite the plate and fresnel lens assembly. The mirror 36 reflects the image along a folded optical path through a focusing lens 38 and against a light position sensing device 40, also mounted within the housing and along the folded optical axis as best shown in FIG. 2. A filter 42 may also be provided in front of the lens 38 for passing a narrow band of light against the device 40 as a further means of insuring that the instrument responds only to a light source from the stylus 32.

There are other techniques that may be used to eliminate the effects of ambient light. One is to employ a relatively narrow band optical source, for example, a gallium arsenide light emitting diode, which generates light at a wave length of approximately 9,000 Angstroms, with a spectral band width of approximately 400 Angstroms. Alternate gallium arsenide light sources have been used at slightly different frequencies; some units use 9,300 Angstroms plus or minus 400 Angstroms. A filter is placed in the optical path preferably quite close to the photocell, and designed to transmit nearly all of this light while excluding the bulk of other light which may interfere. A multiple layer interference type filter works well or a long-wave length-pass Wratten filter can be used to take advantage of the cutoff of the silicon photocell to exclude the long wavelength light beyond the useful region.

Another technique used to eliminate the effect of the ambient light, and the dark current associated with most photocells is to pulse the light source. Preferably it is turned on and off rapidly, at a low duty cycle, so that is spends more time off than on. This has several advantages. It permits use of a higher intensity source, and, by measuring only the A C or pulse signal, eliminates the effects of a steady ambient light. In addition, the dark current associated with most photocells is completely ignored, since it is a D. C. component.

The light position sensing device 40 is a dual axis, solid state photo detector that produces an electrical output signal corresponds to the position of a light spot on its surface and another electrical signal corresponding to the intensity of that light spot. Photo sensors of this sort are available from United Detector Technology of Santa Monica, Calif., and are sometimes known as Schottky barrier photo diode devices and have a position resolution capability of one millionth of an inch and linearities better than 5 percent are possible. The devices provide two electrical output signals specifying the X and Y position of an input light spot signal that is relative to fixed internal coordinates. When the input light spot is exactly at the center of the device, no electrical signals are generated. By moving the light spot over the active area, continuous electrical signals are provided at the terminals giving the exact light spot position at each instant of time. The electrical signals are proportionately related to the light spot position from the center and thus provides an analog error signal proportional to the displacement.

The input light beam to these detectors may be any diameter, since the position of the centroid of the light spot is indicated and provides electrical output signals proportional to the position from the center. When any light beam, no matter what its diameter, as long as it forms within the active area, is positioned at the device center, a complete null is obtained in the difference of any of the currents flowing through the terminals on that axis to the center terminal. When just one of the axes feed through is connected to an external battery and load resistor, the current arising from the total light flux falling on the detector is collected at that one terminal. It is essentially the difference in current from each of the terminal feed through to the center terminal that gives the position indication.

Located directly on the housing 12 are digital indicators 44 and 46 representing the Y and X coordinates, respectively, whereby the operator has an immediate visible digital readout of the corresponding digital position of the stylus with respect to the tablet surface 30 and permitting the operator to verify the information before sending it to a computer or the like.

Located across the top wall 22 of the housing 12 are the various function push buttons which control the selection of up to eight modes of instrument operation. In the illustrated embodiment the buttons, from left to right, include an off-on button 48, a locate button 50, a point plot button 52, a vector button 54, a chain vector button 56, a continuous plot button 58, a character generation button 60 and an erase button 62. The locate button 50 provides a mode of operation in which the stylus is positioned by contact and movement on the tablet for exact location continuously shown on the digital indicators 44 and 46. The point plot button 52 initiates a mode which permits computer entry of the one individual point selected by the free hand positioning of the stylus on the tablet surface. The vector button 54 initiates a mode in which vectors are created simply by establishing two end points, after verifying the exact position of each through reference to the digital indicator display. The chain vector button 56 initiates a mode in which continuous vectors are drawn by the stylus with the tip of each segment establishing a start point for the next segment. The continuous plot button 58 initiates a mode in which there is an instantaneous feeding of consecutive points to the computer as rapidly as they are drawn across the tablet surface. The buttons 60 and 62 may be used for optional functions such as erase or character recognition to be determined by software associated with a computer.

Figure 4:
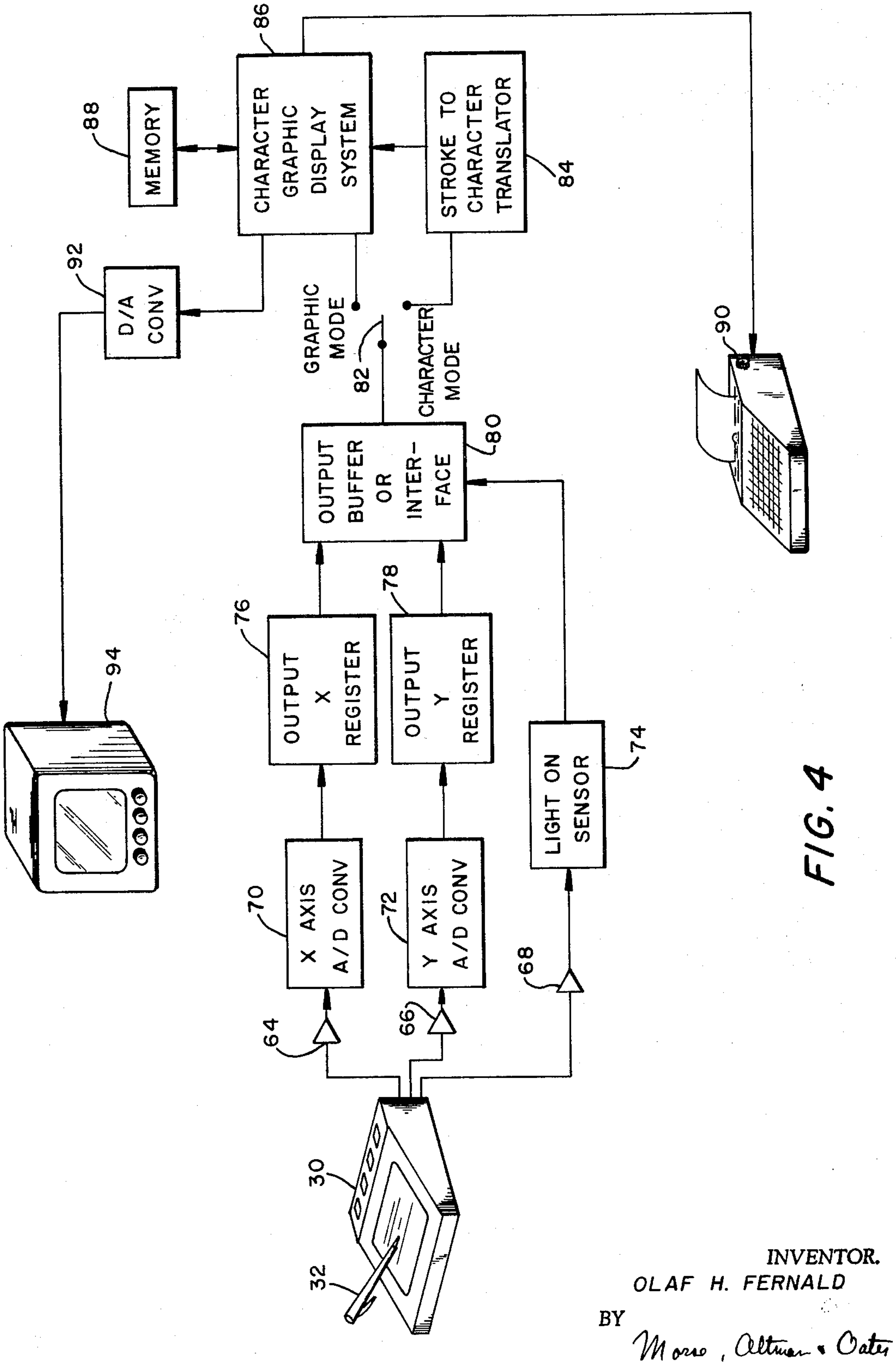
FIG. 4 is a schematic diagram showing the tablet in a system with certain output terminals.
Figure 5:
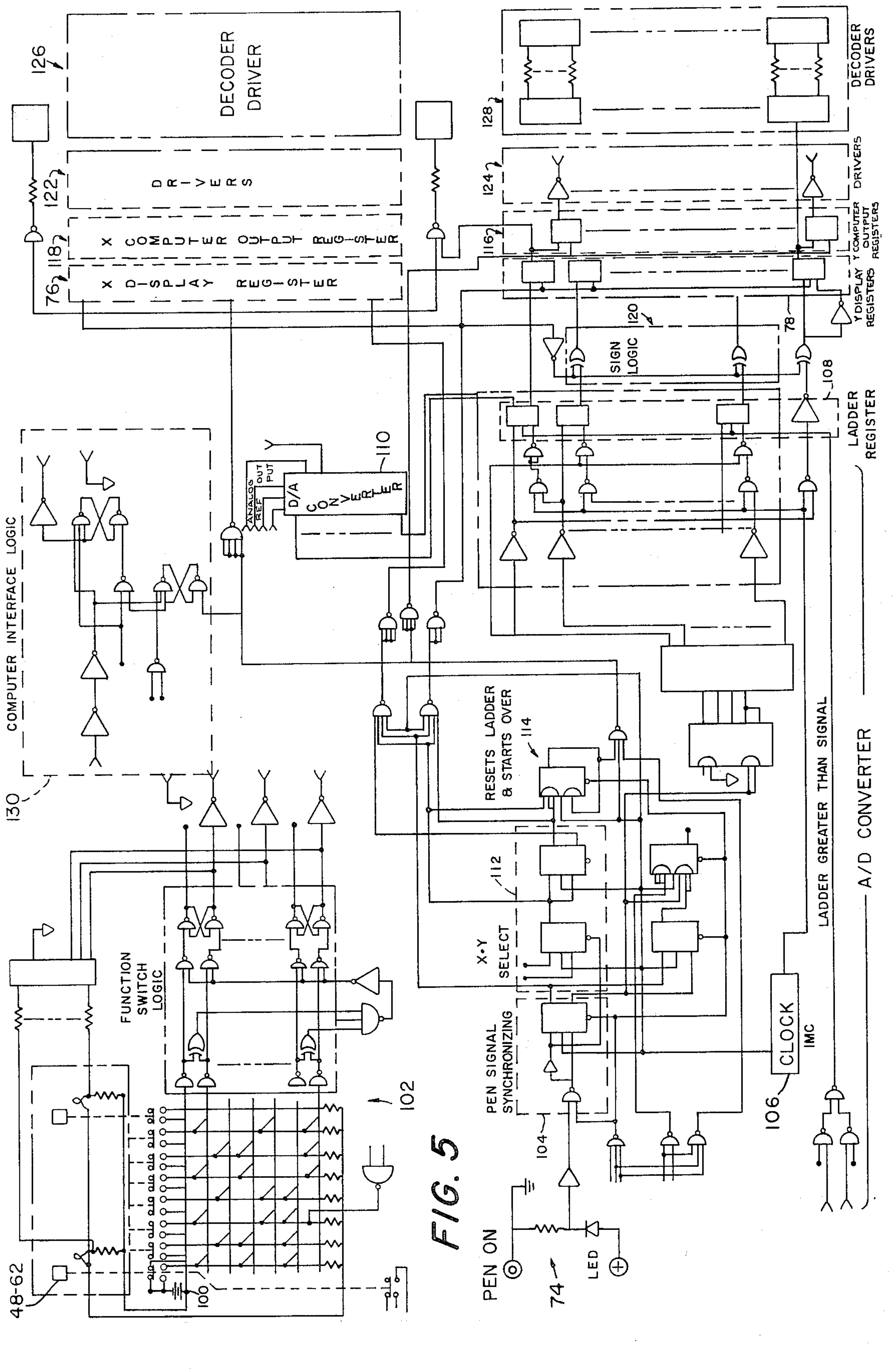
FIG. 5 is a diagram of the digital logic circuitry for the tablet.

Referring more particularly to FIG. 4 there is shown in block diagram a data input tablet made according to the invention and operatively connected to two different output terminals one digital, the other analog. In general, as the light pen 32 is used by the operator to write on the plate 30 the light position sensing device 40 will generate analog signals indicating the position of the light pen on the plate surface. The analog signals from the device 40 are processed through pre-amplifiers 64, 66 and 68 to amplify, respectively, the X position analog signal, the Y position analog signal and the intensity signal. From the pre-amplifiers 64 and 66 the X and Y signals are processed separately through an X axis analog to digital converter 70 and a Y axis analog to digital converter 72. The intensity signal is passed through a "light on" sensor 74 such as a Schmidt trigger, for example, which verifies the intensity of the light emitted by the pen 32. This sensor can be adjusted to prevent the system from operating on ambient background illumination only. The output of the converters 70 and 72 provide digital information with respect to the pen position, the signals being fed to X and Y registers 76 and 78, thence into a buffer or other interface device 80 also receiving signals from the sensor 74. The buffer output is fed through a mode operating switch 82 selectively either to a stroke to character translator 84 or directly to a character graphic display system 86 operatively connected to a memory 88. The unit 86 has outputs to a digitally operated typewriter 90 for producing a direct hard copy or through a digital to analog converter 92 to a CRT display terminal 94. Thus, by employing an automatic typewriter in conjunction with the tablet, a fully automatic stenographic system is provided.

Referring now more particularly to FIG. 4 there is shown in greater detail the digital logic circuitry employed with the tablet, the circuit being generally organized into a plurality of functional sub-systems. The several inputs include the function buttons 48 through 62 connected to a power supply 100 and controlling function switch logic 102. The light sensor 74 to determine that the pen is illuminated feeds to a pen signal synchronizing circuit 104 and a clock 106 provides the necessary timing pulses for the system. In the illustrated embodiment an IMC clock is provided.

The functional circuit also includes the A/D converters 70 and 72 receiving their signals from the pre-amplifiers 64 and 66 including a ladder register 108 feeding to a D/A converter 110. An X Y select circuit 112 and a ladder reset 114 are provided. Between the D/A converters 70 and 72 and the X and Y display registers 76 and 78 (operating the X Y displays 44 and 46), coupled to X and Y computer output registers 116 and 118, is a sign logic section 120 comprised of a series of exclusive OR logic devices. From the registers 116 and 118 are X and Y computer output drivers 122 and 124 feeding to the decoder drivers 126 and 128. Finally, the system includes computer interface logic 130.

Figure 3:
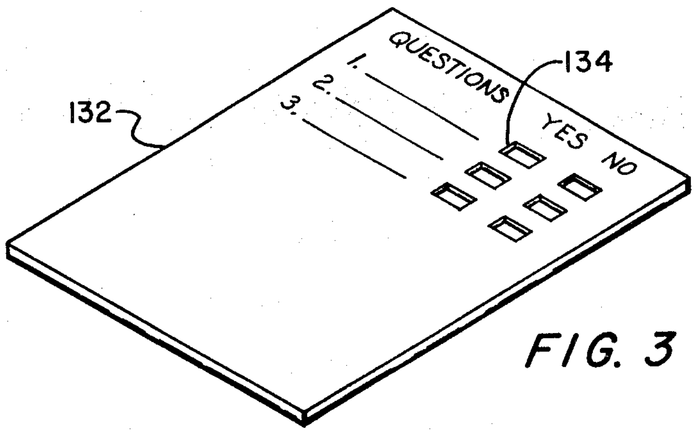
FIG. 3 is a perspective view of an overlay mask for use with the tablet.

The device is useful for a variety of applications and has output options including serial output for teletype use, analog voltage and other arbitrary computer of display interface accommodations. The unit has a plotting rate of 5,000 coordinate pairs or points per second permitting full computer input of arbitrary path of free-hand drawings. In addition to its use as a tool for engineering drawings and mathematical graph construction, it can be employed by computer users who have simple data entry needs. For example, an overlay mask 132 (FIG. 3) may be placed over the plate 30 permitting unskilled personnel to operate the instrument with ease. Typically, the overlay may be provided with a series of questions opposite several perforations 134. The operator may read the questions and after selecting an answer, place the light pen over the appropriate perforation. Thus the information may be sent directly into a computer. The device thus becomes a keyboard substitute and appropriate overlays may be developed for writing in a program with ASCII code. Overlays may be developed for use in direct translations and a mask with a basic 500 word vocabulary, for example, may be used in conjunction with perforations to provide a quick and easy means of translating from one language to another using appropriate output terminals.

While the optical system has been shown folded for compactness, larger straight line optical systems may be employed where size is not a significant factor.

Figure 6:
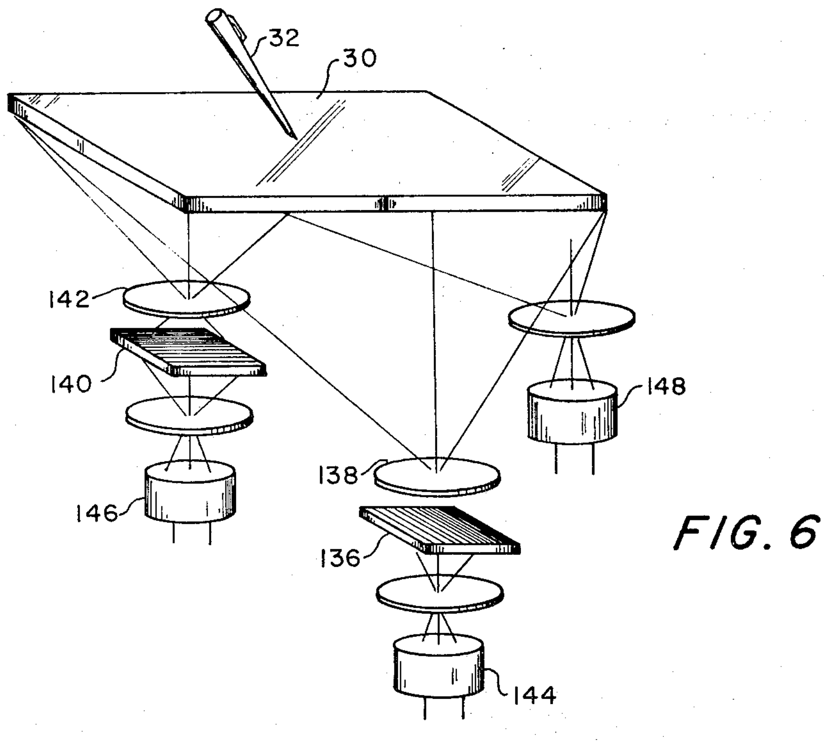
FIG. 6 is a schematic view in perspective showing a modification of the invention, and, FIG. 7 is a diagram of division circuitry used with the tablet.

Referring now to FIG. 6 of the drawings, there is illustrated a modification of the invention and in this embodiment the position sensitive photocell 40 is replaced by a linearly graduated density film 136 located behind a lens 138 in the image plane where the density of the film is directly proportional to the X coordinate. A similarly graduated density film 140 is applied in the Y direction through another lens system 142. In this case, the amount of light transmitted through the variable density filters 136 and 140 would generate a signal which is proportional to the product of the intensity of the light and the X displacement in one photocell 144 and proportional to the intensity of the light times the Y displacement in the second photocell 146. A third photocell 148 of the ordinary PIN junction type, non-direction sensitive, would monitor the intensity to provide the correction described below to the signals for input to the amplifier and A to D networks.

For both the position sensitive photocell 40 of the principal embodiment and the alternate detector technique of FIG. 6, it is necessary either to maintain the intensity of light as received at the photocell at a constant level by means of a feedback circuit or correct for variations in light intensity. With the feedback circuit, the photocell which measures the intensity of the light as received (in the alternate detector scheme) or the signal out of the position sensitive photocell 40 which is proportional to the intensity of the light, can be used in a closed loop feedback circuit. The amount of the signal intensity is compared against a threshhold signal. The difference or "error signal" is amplified and used to correct the intensity of the light generated by the original light source, so that the intensity at the detector remains constant.

Figure 7:
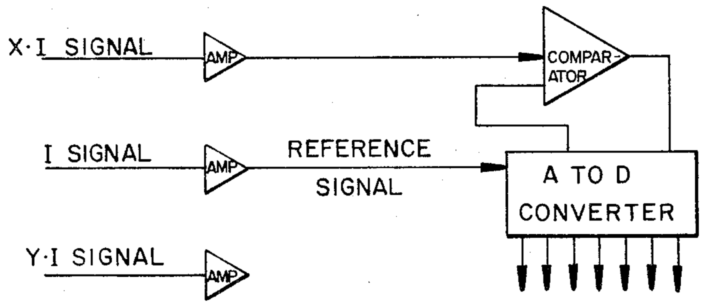

A second technique is to use a division network as shown in FIG. 7. In this case, the division network is set up such that the X-amplitude times intensity signal is divided by the intensity signal to generate a signal which is directly proportional to X. The division can be accomplished by a large number of well known analog division circuits, or alternately it can be accomplished in the A to D convertor by using the amplified intensity signal as a reference. In this case, the A to D convertor generates a digital signal which is proportional to the digital number as a fraction times the reference signal. This is then compared with the input analog signal and adjusted to be equal to this analog signal. The digital output then is read and represents the ratio of the input analog signal to the reference analog signal.

(Digital Signal). (Reference) = Analog Signal

Ref. ~ I (I = Intensity)

K.X.I/I = K.X

K is adjustable by circuitry to make the readings agree with the position on the tablet.

Having thus described the invention, what I claim and desire to obtain by Letters Patent of the United States is:

1. An optical graphic data tablet, comprising in combination
   a. an independently manually movable light source adapted to produce a light spot,
   b. a fixed and uniformly transparent stratum providing a working surface for said source,
   c. a fixed and continuously responsive solid state dual axis photo detector positioned in optical relation to said stratum and having a continuously variable analog output related to the absolute position of said light spot thereon said detector being a Schottky barrier photo diode, and,
   d. fixed continuously transparent optical means mounted in the optical path between said source and said detector for focusing said independently movable light spot at said surface onto said detector,
   e. said stratum, said optical means and said detector defining a continuously clear field of view over substantially the entire working surface.

2. An optical graphic data tablet according to claim 1 including digital display means in proximity to said stratum for displaying digital data with respect to the position of said spot on said stratum, and electronic converting means connected between said sensing means and said display means for converting the output of said sensing means into an input for said display means.

3. An optical graphic data tablet according to claim 1 including reflecting means disposed along the optical axis of said stratum and said sensing means for folding said axis.

4. An optical graphic data tablet according to claim 1 including a fresnel lens disposed in close parallel relation to said stratum between said stratum and said sensing means.

5. An optical graphic data tablet according to claim 1 wherein said stratum is a semi-reflective plate.

6. An optical graphic data tablet according to claim 1 in combination with an analog to digital converter connected to said photo-detector to provide digital signals corresponding to the position of said spot.

7. An optical graphic data tablet according to claim 1 in combination with a mask adapted to overlay said stratum, said mask bearing intelligent information and formed with a plurality of apertures related thereto.

8. An optical graphic data tablet according to claim 1 in combination with a computer.

9. An optical graphic data tablet according to claim 1 in combination with a computer output terminal and means for converting the output of said sensing means into signals adapted to operate said terminal.

10. An optical graphic data tablet according to claim 9 wherein said terminal is a typewriter.

11. An optical graphic data tablet according to claim 9 wherein said terminal is a cathode ray tube.

12. An optical tablet according to claim 1 wherein said sensing means includes a pair of gradient density filters in the image plane of said optical means and oriented perpendicularly to one another and light measuring means operatively associated with each filter for measuring the intensity of light passing therethrough.

13. An optical tablet according to claim 12 including third light measuring means for directly measuring light from said source passing through said stratum.

14. An optical tablet according to claim 1 including pulsing means for pulsing said light source and pulse measuring means connected to said sensing means for measuring pulsed light only.

15. An optical tablet according to claim 1 including a filter in the optical path of said sensing means for passing a relatively narrow band of light emitted by said source.

16. An optical tablet according to claim 1 including feedback means between said sensing means and said source for maintaining constant light intensity.

* * * * *